(No Model.)

J. T. BIBB.
PIPE UNION.

No. 489,784. Patented Jan. 10, 1893.

WITNESSES:
E. C. Duff
Chas. M. Werle

INVENTOR
John T. Bibb
BY O. E. Duff
ATTORNEY.

UNITED STATES PATENT OFFICE.

JOHN T. BIBB, OF TACOMA, WASHINGTON.

PIPE-UNION.

SPECIFICATION forming part of Letters Patent No. 489,784, dated January 10, 1893.

Application filed April 16, 1892. Serial No. 429,494. (No model.)

*To all whom it may concern:*

Be it known that I, JOHN T. BIBB, a citizen of the United States, residing at Tacoma, in the county of Pierce and State of Washington, have invented a new and useful Improvement in Pipe-Unions, of which the following is a specification, reference being had to the accompanying drawings, which form part hereof.

My invention relates to improvements in unions for stove pipes, smoke stacks and other pipes of a similar make and character, requiring the different sections to be united.

The invention consists in certain novel features of construction and in combinations of parts more fully described hereinafter and particularly pointed out in the claims.

The object of the invention is to provide a pipe union which will form a very tight joint and which can be quickly applied and locked without the use of peculiar tools and which can be removed, if necessary without injury.

Figure 1:
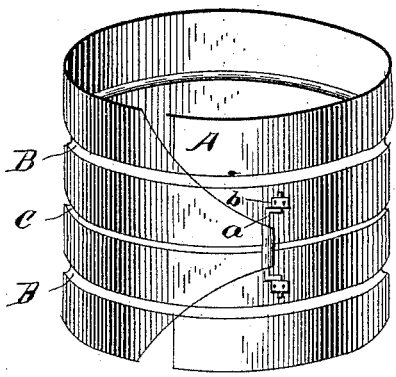
Figure 2:
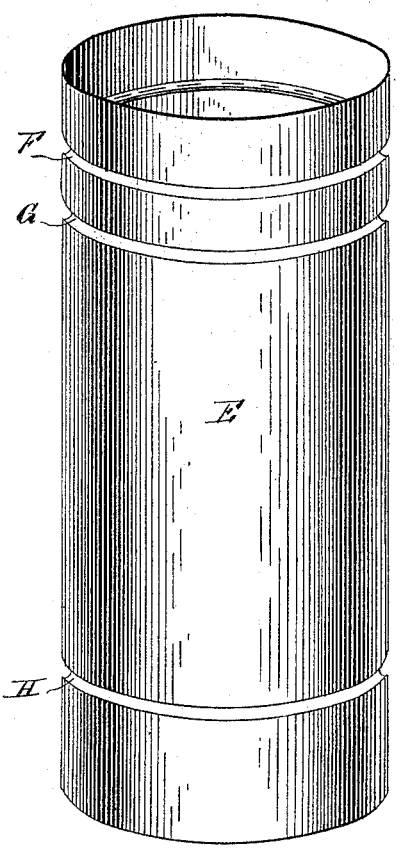
Figure 3:
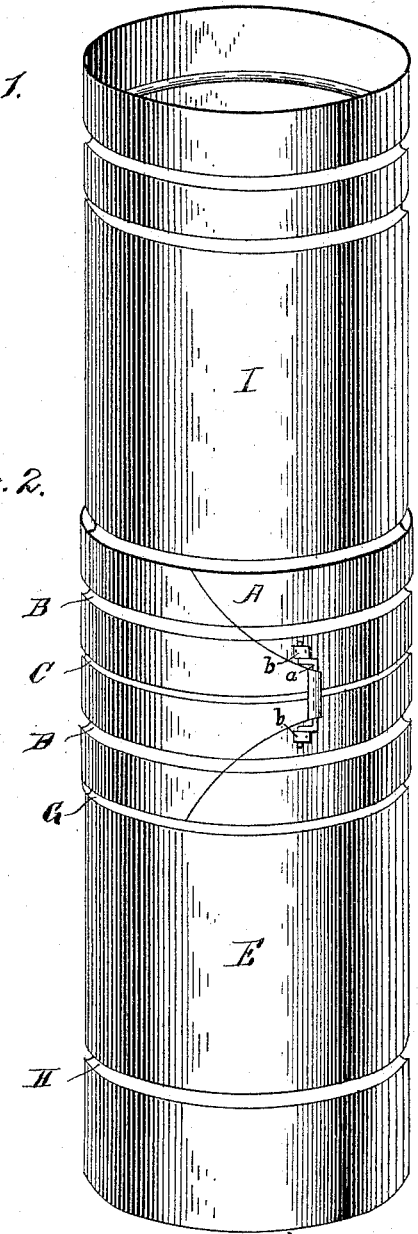

Referring to the accompanying drawings;— Figure 1 is a detail perspective of the pipe coupling union. Fig. 2 is a perspective of a section of the pipe to be coupled. Fig. 3 is a perspective of two sections of a pipe united by the coupling.

In the drawings the reference letters I and E indicate two adjacent pipe sections each having one or more annular grooves near its ends. One groove H can be formed in the pipe or if desired two parallel grooves F, G, can be formed therein.

A, indicates the expansible coupling or union sleeve formed as a section of the pipe, but slightly larger in diameter so that it can slip up over the ends of the sections. This union is provided with an internal stop or shoulder C against which the ends of the pipe sections can strike and by which they are stopped. The union is also provided with internal beads B B near its ends to intermesh with the grooves F, G, or H in the pipe ends when the parts are coupled and thereby firmly hold the pipe sections against independent longitudinal movement.

The union is expansible by having the ends of the piece of sheet metal forming it, loosely overlapping as shown. The outermost of the overlapping union ends is preferably tapered and its extremity is bent or looped around the central outwardly bent portion of the locking device *a*. This locking device is formed by a crank shaft, the end mentioned being journaled to the crank of the shaft while the shaft ends are journaled in boxes *b b*, secured on the outer face of the opposite end of the union, thereby raising the shaft ends above the surface of the union. The spring of the metal forming the union tends to open the same to its greatest diameter so that it can be easily slipped on the pipe ends. When thus opened the crank shaft swings in toward the end of the sections with the tendency to separate as far as possible.

When the union has been placed on the pipe sections with the head B B registering each with a groove F, G, or H. After the parts have been thus fitted the eccentric lever or crank shaft *a a* is swung up and outwardly and down on the face of the union thereby contracting the union tightly and rigidly on the pipe ends and as the ends of the crank shaft are slightly raised the crank thereof will drop on the face of the union below the line of strain. The union is thus firmly and rigidly locked. A tight joint is thus formed so that a perfect draft can be maintained in the furnace, stove or the like.

The device is very cheap, simple and yet exceedingly strong and durable, and is easily and quickly operated without the use of exterior tools.

It should be observed that the union can be easily released when desired and that the parts constituting the union are always together.

Having thus fully described my invention what I claim and desire to secure by Letters Patent is:—

1. The split pipe union having its ends overlapping, and the rod having its ends bent to form cranks and permanently journaled on one end of the union, the other end of the union being loosely and permanently secured to said rod between the cranks thereof, whereby the union is expanded or contracted as described by swinging said rod.

2. The expansible union having its ends overlapping and permanently secured together by an eccentric locking device composed of a crank shaft, the ends of which are journaled in the boxes on one end of the union, the other end of the union being bent loosely around the center of the shaft, the pipe ends and union having beads arranged to intermesh, as set forth.

In testimony whereof I hereunto set my signature in the presence of two witnesses.

JOHN T. BIBB.

Witnesses:
M. A. DAILEY,
H. T. SABIN.